Sept. 15, 1970     M. S. STEVENSON     3,528,508
SOD DISTURBING AND REPLANTING APPARATUS
Filed April 8, 1968     2 Sheets-Sheet 1

INVENTOR
MARION S. STEVENSON

BY

ATTORNEY

INVENTOR.
MARION S. STEVENSON
ATTORNEY

# United States Patent Office 3,528,508
Patented Sept. 15, 1970

3,528,508
SOD DISTURBING AND REPLANTING
APPARATUS
Marion S. Stevenson, Rte. 4, Winnsboro, S.C. 29180
Filed Apr. 8, 1968, Ser. No. 719,354
Int. Cl. A01b 21/04
U.S. Cl. 172—554                                    6 Claims

ABSTRACT OF THE DISCLOSURE

Disclosed herein is a sod disturbing and replanting apparatus having a frame supported for translational movement over existing grass sod by a horizontally disposed cylindrical drum mounted for rotation about a transverse axis. Uniformly mounted and distributed over a continuous outer surface of the drum and projecting radially at an inclination in the direction of drum rotation are a plurality of elongated sod disturbing spikes adapted to penetrate and break up sod subsoil while merely loosening soil at the sod surface, all without appreciably disrupting or tearing existing plant growth. The number and spacing of the individual spikes is such that the weight of the apparatus exceeds the sod's resistance to spike penetration only by an amount sufficient to cause the outer drum surface to bear relatively lightly upon the sod surface between adjacent places of spike penetration. Mounted on the frame of the apparatus and adapted to be driven by the rotatable drum is a dispensing mechanism arranged to discharge replanting ingredients, such as grass seeds, uniformly onto the freshly disturbed sod. Provisions are also made for propelling the apparatus over the sodded surface and for varying the weight thereof where different sod hardnesses are encountered.

BACKGROUND OF THE INVENTION

This invention relates to an improved and novel sod disturbing and replanting apparatus for breaking up and agitating the subsoil of existing grass sod or other plant growth while at the same time loosening the surface soil and replanting the sod so disturbed with minimum destruction of the plant growth at the soil surface.

After initial plowing and planting of a permanent grass lawn, the lawn surface is packed down over the years from traffic and weather effects into a hard compact layer of grass sod. Water and air cannot readily penetrate this firmly packed layer and as a result patches of grass often die from plant diseases, lack of water or air, and other afflictions. It then becomes necessary to replant an existing lawn with a permanent type of grass to replace that which has died and to fill in spotty and denuded areas of lawn surface. In replaning an existing grass lawn it is highly desirable merely to loosen the surface soil without unduly tearing or turning the sod surface and without killing any of the existing grass or other plant growth thereon. On the other hand, it is also desirable to thoroughly break up and agitate the subsurface soil of the compact sod layer to aerate the same and permit the young roots of replanted grass to penetrate into he soil as necessary for proper seed germinaion. Thorough agitation of the subsoil while loosening the surface soil also facilitates introducing water and lawn dressings, such as chemicals and fertilizers, deep into the sod through the loosened surface.

Prior to the present invention it has been proposed to chop up the soil surface by the use of cutting or digging blades of various designs and then to dispense grass seeds over the surface so disturbed. These devices turn over and destroy the sod at the soil surface so that the existing lawn grass or other vegetation ultimately dies as a result of the cutting and exposure of its root system. While a number of devices have also been suggested for subsoil penetration, such devices are primarily for subsoil aeration without provision for loosening and replanting the soil surface. Furthermore, soil aeration devices heretofore found in the art to a large extent tear up the sod surface similar to the aforementioned surface disturbers and fail to penetrate to a sufficient depth to properly agitate and break up the subsoil of the sod.

SUMMARY OF THE INVENTION

With the foregoing in mind, a principal object of the present invention is to provide a device of the character described embodying novel features of construction and arrangement whereby passage of the device over a sodded lawn or field of grass or other plant growth thoroughly breaks up and agitates the sod subsoil while loosening and replanting soil at the sod surface without disrupting the existing plant growth thereon. Incorporated in the device is a sod disturbing component of unusual construction which opposes disrupting influences at the sod surface while at the same time utilizing to best advantage full subsoil penetration and agitation. The device further utilizes the disturbing component to drive a mechanism for uniformly dispensing replanting ingredients onto the sod surface immediately after the sod is disturbed and before it can resettle or pack down significantly. Provision is also made for advantageously using standard farm equipment to propel the apparatus over the sodded ground surface to be disturbed and planted, and for adapting the unit for operation over sod having different degrees of hardness.

In addition to the numerous advantages which will be apparent from the above discussion, the present invention has the further advantage of simplicity and ruggedness. The apparatus of the present invention can be constructed with relatively few parts, all of which are commercially available. Other advantages will apear from the specific description of the invention which follows hereafter.

DESCRIPTION OF THE DRAWINGS

For a better understanding of the present invention reference is made to the accompanying drawings in which.

DETAILED DESCRIPTION OF INVENTION AND PREFERRED EMBODIMENT

Figure 1:
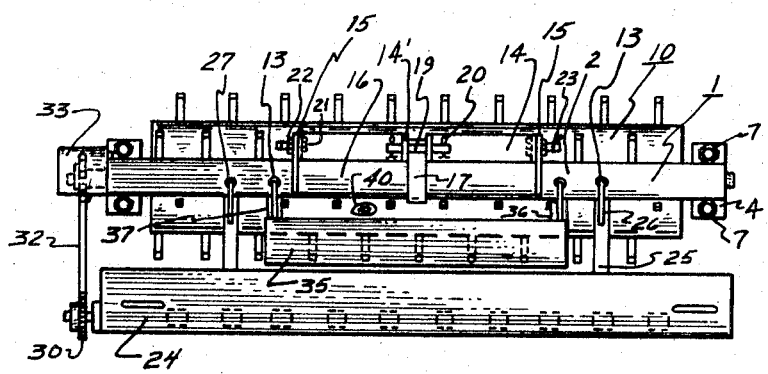
FIG. 1 is a plan view from above the present invention.
Figure 2:
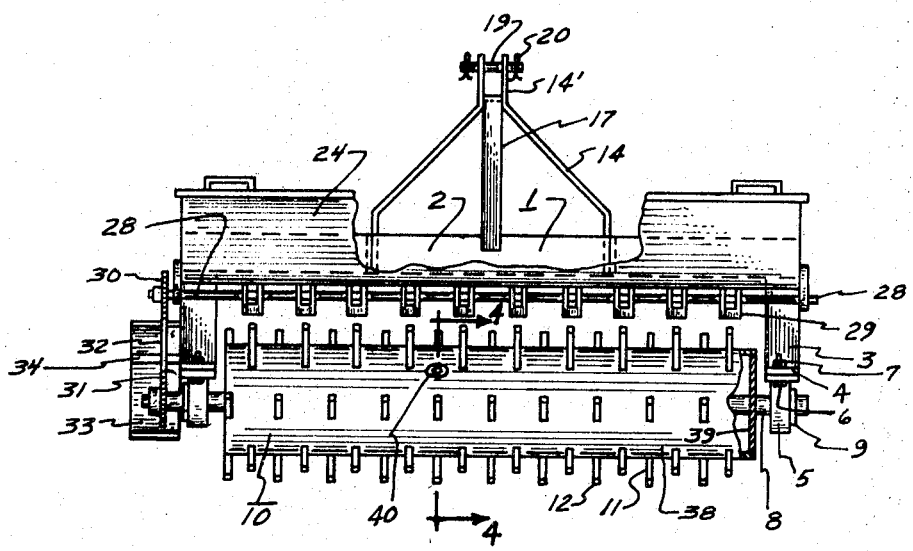
FIG. 2 is a rear elevation of the invention.

Referring now to the drawings, and particularly to FIGS. 1 and 2 thereof, there is illustrated one form of the apparatus made according to the present invention. As shown therein, the apparatus may comprise an inverted U-shaped frame 1 including a horizontal crossbar 2 and a pair of vertically depending side members or legs 3—3 spaced transversely to the direction of operable frame movement, all of said frame elements preferably being of hollow construction with a rectangular cross-sectional shape.

Secured at the bottom of depending legs 3—3 are small horizontal bearing support plates 4—4 to which conventional pillow block bearings 5—5 are detachably mounted by any suitable means such as threaded bolts 6 and nuts 7. Rotatably mounted in pillow block bearings 5—5 on a horizontal axis between said depending legs is a shaft 8 fixedly secured against longitudinal movement by means of locking collars 9—9 attached at each end thereof.

Fixedly mounted on shaft 8 for rotation therewith and movably supporting frame 1 is a hollow horizontally disposed drum 10 including a continuous cylindrical side wall 38 and end walls 39—39, said drum being of a watertight construction. Rigidly secured on the outer supporting surface of said cylindrical drum wall are a plurality of sod penetrating and disturbing elements or spikes, generally designated by reference numeral 11. The spikes 11 are arranged in transversely extending rows parallel to the drum axis and spaced around the circumference of the drum at equal intervals of arc. The intervals of arc between rows of spikes around the drum circumference and the spacing of individual spikes in each transverse row are such that the spikes are uniformly distributed over the outer drum surface at substantially an equal distance apart. In the preferred embodiment, adjacent rows are offset transversely to each other so that spikes in every other row fall intermediately between and equidistant from spikes in the remaining rows as best seen in FIG. 2 of the drawings. With this staggered or offset arrangement between adjacent rows of spikes, the distance on the sod surface between the places penetrated by spikes in a line along the direction of translational drum movement is twice the arc interval between adjacent rows of spikes. The greater distance between in line spike penetrations reduces surface disruption by leaving intact portions of the sod root system which cause disturbed turf immediately to the rear of a withdrawing spike to fall back into place. From an examination of FIG. 4 of the drawings, it will be seen that one spike in every other transverse row falls within a sectional plane taken perpendicular to the drum axis in the direction of translational drum movement.

Figure 4:
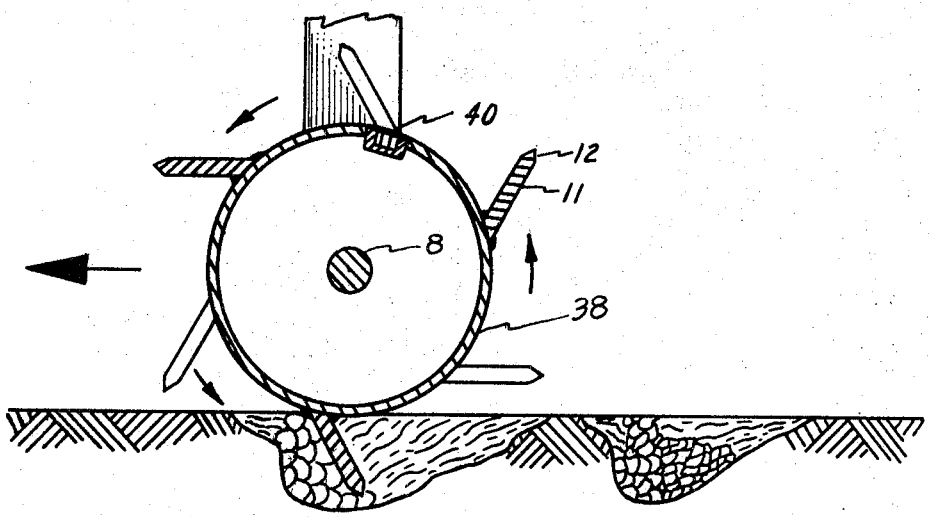
FIG. 4 is a fragmentary sectional view taken on line 4—4 of FIG. 2 showing the novel manner in which the sod disturbing spikes of the apparatus enter, disturb and leave the sod.

The construction and positioning of the individual sod disturbing spikes 11 and the manner in which they enter, disturb and leave the sod constitute an important feature of the present invention. The individual spikes are all of identical construction having one elongated dimension and are mounted on the outer cylindrical drum surface so that the longitudinal axis thereof projects radially outward from the drum surface at an angle inclined toward the direction of operable drum rotation, as best shown in FIG. 4 of the drawings. The angle of inclination may be measured between the spike's longitudinal axis and an imaginary line tangent to the drum surface at the base of the spike. In the preferred embodiment this angle is the same for all spikes and has a value of approximately 45°. However, other angles of inclination may be used in the range of from 35° to 60° with satisfactory results.

With reference to the particular construction of each spike, the cross-sectional thickness thereof in a plane perpendicular to the spike's longitudinal axis is substantial and is roughly equal in all directions to provide a transverse cross-sectional shape adapted to loosen the soil at the sod surface by causing substantial horizontal displacement of the soil around the place of spike penetration. I have found that spikes 4 inches long having a transverse cross-section ⅝ of any inch square loosen the surface soil and break up the subsoil satisfactorily. The outer sod penetrating end 12 of each spike is tapered to a sharp edge along two intersecting planes and the spike mounted relative to the drum surface so that this sharp edge extends parallel to the drum axis. The angle of taper as measured between the two intersecting planes is 30° in the preferred embodiment, although other angles of taper can be used.

The next important feature of my novel device is the number, size and spacing of the spikes over the drum surface in relation to the overall weight of the apparatus constituting this invention. Depending on the overall weight of the apparatus and the size of spike used, the number and equidistant spacing of the individual sod disturbing spikes are selected so that the weight of the unit as a whole is sufficient to cause the projecting length of the spikes to fully penetrate into the sod, bringing the outer cylindrical supporting surface 38 of the drum at the base of the spikes into contact with the sod surface between the places of spike penetration. On the other hand, in order to have the maximum number of spikes available for sod disturbance, the equal spacing or distance between adjacent spikes is no greater than necessary for full spike penetration. Because of this, the cylindrical drum surface bears relatively lightly upon the surface of the sod. The spacing of the spikes for a given unit weight is, of course, dependent upon the hardness or resistance to penetration of the sod encountered in the locality in which the unit will be used.

According to the preferred embodiment of the invention, a cylindrical drum 5 feet in length and 12 inches in diameter is employed in a unit having an overall weight of approximately 700 pounds. A total of 60 spikes are arranged over the surface of the drum in six parallel rows of 10 spikes each, the rows being spaced at 60° intervals of arc around the drum circumference and the individual spikes in each row being spaced 6 inches apart. Since 60° of arc equals roughly 6 inches of circumference around a drum 12 inches in diameter, the spikes are uniformly distributed over the drum surface with adjacent spikes being substantially an equal distance apart. With this arrangement a sodded lawn will be uniformly and thoroughly disturbed. Furthermore, as seen in FIG. 4 of the drawings only a single row of spikes will be in engagement with the ground at the point where the greatest depth of spike penetration is attained so that a maximum penetrating force of 70 pounds per spike is available to force the spikes into the sod. In the area of my home the sod's resistance to penetration is such that this penetrating force, while sufficient to cause full penetration of the spikes, produces relatively light bearing pressure between the drum and the sod surface. Although the length and cross-sectional area of the spikes is a factor in determining the optimum arrangement of spikes on the drum surface, these dimensions may vary substantially without appreciably altering the number and spacing of spikes for a given unit weight.

Should the resistance of a sodded lawn or other area to spike penetration increase due to a loss of moisture or other weather effects, or in the event that greater penetration resistance is encountered with sod found in different geographical locations, the overall weight of the apparatus can be correspondingly increased. Where a marked or sharp increase in sod penetration resistance is encountered, a lead weight 18 may be detachably affixed to the horizontal crossbar 2 of the frame by means of horizontal struts 36—36 and hanger rods 37—37 having bent outer ends which fit into holes 13 in the crossbar. Where smaller variations in sod penetration resistance are encountered, the weight of the apparatus can be altered by adding or draining water from the hollow watertight drum 10 by means of a removable plug 40 installed in the outer cylindrical drum wall 38. The removable plug installation may be of any suitable watertight construction known in the art, such as a threaded plug screwed into an aperture in the drum wall having threads cooperating with those of the plug. As the cylindrical drum 10 of the preferred embodiment has a volume of roughly 25 gallons. the quantity of water required to completely fill this drum weighs approximately 200 pounds so that the apparatus weight would be increased by that amount when the drum is filled to capacity. Should a smaller increase in apparatus weight be necessary for proper operation of the device, the disturbing drum need only be partially filled with water to give the desired overall weight or fluids having densities less than water may be used.

Figure 3:
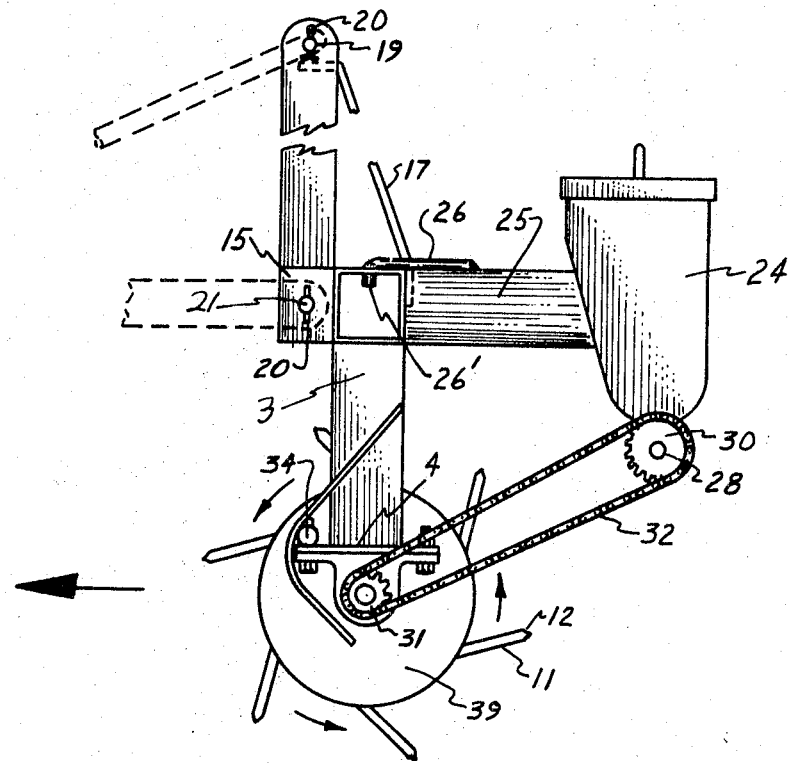
FIG. 3 is a side elevation of the invention showing the mechanism for driving the dispensing component of the apparatus.

The apparatus of the present invention is adapted to be pulled or drawn over the sod to be disturbed and replanted by a tractor or the like having a conventional towing mechanism commonly known as a 3 point hitch. The apparatus can be connected to any standard 3 point hitch by means of vertical tongue elements 14—14 fixedly secured to the horizontal cross bar 2 of the frame by means of forwardly projecting hitch plates 15—15 mounted on the crossbar 2, the top and forward sides of the hollow crossbar having been cut away at 16 to provide an L-shaped open section within which hitch plates 15—15 are fixedly secured. The vertical tongue elements 14—14 are reenforced by means of a strut 17 fixedly secured at its upper end as a spacer between the upper portions 14'—14' of the tongue elements and at its lower end to the outside rear of frame crossbar 2 as best shown in FIGS. 2 and 3 of the drawings. The tongue elements and related components are preferably secured together by welding. The single upper lift bar of a standard 3 point hitch can be detachably connected between the upper portions 14'—14' of the tongue elements by means of hitch pin 19 which passes through an aperture in the end of the lift bar and corresponding apertures in each tongue element, hitch pin 19 being held in position by cotter pins, generally designated by reference numeral 20, in each end thereof. One of the two lower tow bars of the conventional three point hitch can be attached to each hitch plate 15 at the base of tongue elements 14—14 by means of outwardly projecting threaded bolts 21—21 passing through both the lower ends of the tongue elements and the outer ends of the hitch plates. The threaded bolts 21—21 are secured in position by means of lock nuts 22—22 and each bolt is provided with an aperture 23 through which additional cotter pins 20 are inserted to hold the lower tow bars onto the outwardly projecting shaft of bolts 21—21. The upper lift bar and the two lower tow bars of a conventional 3 point hitch are shown attached to the vertical tongue elements and to the hitch plates of the apparatus by dotted lines in FIG. 3 of the drawings.

In conventional 3 point hitch mechanisms the upper lift bar is of adjustable length. The arrangement of the vertical tongue elements in relation to the frame of the apparatus permits the entire frame of the seeder to be tilted around the drum axis to change the center of gravity of the apparatus and thus vary the downward component of force transmitted through the tow bars to the towing vehicle. Where necessary, an increase in the downward force component will assist in stabilizing the towing characteristics of the apparatus by minimizing the jerking motions transmitted through the hitch linkage such as often occur in car trailers when excessive weight is located to the rear of the trailer axle. In addition, the upper lift bar of the conventional 3 point hitch is hydraulically operated so that the apparatus of the present invention can be raised from its operating position when not in use and transported over highways and other hard surfaces to and from the place where sod disturbing and replanting is to take place.

A dispensing hopper 24 is mounted on the horizontal rossbar 2 of the frame and spaced to the rear thereof by means of horizontal struts 25—25 to which hanger rods 26—26 are attached in such a manner that the bent ends 26'—26' thereof fit into apertures 27—27 in the top of the horizontal crossbar thereby securing the dispensing hopper in position as shown in FIGS. 1 and 3 of the drawings. The dispensing hopper itself is of conventional construction having a dispensing mechanism operated by shaft 28 running along the bottom thereof through dispensing nozzles 29. As shown in FIG. 2 of the drawings, dispensing nozzles are needed only over the spikes in one of the two sets of transversely offset rows of spikes because the replanting ingredients fall from the dispenser nozzles in a cone pattern that overlaps the penetrations made by spikes in the remaining set of rows. Optimum coverage is thus provided for that portion of the lawn in which the sod has been disturbed in accordance with the teachings of the present invention.

Affixed to one end of shaft 28 of the dispensing hopper is a sprocket 30. A corresponding sprocket 31 is mounted at the same end of the shaft 8 of the disturber drum. A chain linkage 32 connects the disturber sprocket 31 to the hopper sprocket 30 so that as the apparatus is pulled over the sod surface the disturber drum is rotated by the ground engaging spikes and drives the hopper shaft to dispense replanting ingredients over the disturbed sod area. The dispenser of the apparatus described is adapted primarily for dispensing a uniform quantity of grass seed. However, it is within the contemplation of the present invention that other replanting ingredients, such as plant foods and agricultural chemicals, may be similarly dispensed onto the disturbed sod. The apparatus may also be used to replant other types of plant growth, such as clover, in which case seeds of clover instead of grass would be dispensed onto the disturbed sod of an existing field of clover.

To prevent fouling of the disturber sprocket and hopper drive mechanism by existing vegetation on the sod surface, a sprocket guard 33 is mounted on depending frame leg 3 at the corresponding end of the frame by means of a brace bar 34 secured to the interface of the sprocket guard. The inward upper edge of sprocket guard 33 and the inwardly projecting end of brace bar 34 are rigidly attached, preferably by welding, to frame leg 3 and bearing plate 4, respectively, as shown in FIG. 3 of the drawings.

The uniformly spaced relation of the sod disturbing spikes allows the ground surface to be penetrated and loosened and the subsoil broken up in relatively localized areas which helps minimize damage to growing vegetation. In addition, full penetration of the disturbing spikes causes the continuous drum surface to oppose any upward movement of the grass sod as it is disturbed and substantially reduces any tendency of the spikes to tear loose a surface layer of turf. Furthermore, the novel spacing, shape and angular arrangement of the individual spikes makes optimum use of the natural tendency of the interlaced roots of existing vegetation to cause any disturbed sod at the lawn surface to fall back into place as each ground disturbing spikes leaves the ground under the rotational and forward motion of the drum. It is, in part, through optimum utilization of the foregoing factors that the sod disturbing spikes of the present invention break up the subsurface soil while loosening, but without significantly disrupting, the sod surface. Although the surface of the sod is thus only slightly disturbed, it is penetrated and the subsurface soil properly broken up and aerated.

Rotation of the disturbing drum by the pressure exerted on the spikes as the apparatus is pulled forward over the ground drives the dispensing mechanism to sow new grass or other replanting ingredients onto the loosened sod surface before the disturbed sod can settle back into place. Where grass seeds are dispensed, the seeds settle with the sod and work their way into the loosened surface soil for optimum seed growth. When new grass commences to sprout, the young roots find easy access through the loosened surface soil to the thoroughly agitated subsoil and readily germinate over the entire loosened area. In addition, repeated passage of the present invention over the lawn surface, as well as further settling of the disturbed sod and various weather effects, will force a portion of the grass seed into the agitated subsoil further facilitating its germination. Since the surface sod remains relatively undisturbed by the passage of the seeder, surface irregularities which would otherwise be created by turned over sod, kicked up subsoil and other surface disturbance are eliminated and the existing grass lawn may be readily cut while at the same time the new grass seed may be watered and fertilized as it lies protected in the disturbed sod.

It is within the contemplation of the present invention that the apparatus described may be made self-propelling by mounting the various components directly on a vehicle having a gasoline engine or other source of motive power. The disturber drum could be mounted on such a vehicle in a manner similar to that of the front packing drum of an ordinary steam roller and the dispensing mechanism mounted in appropriate relation to the drum. Furthermore, the power source of a self-propelled vehicle might be connected directly to the disturber drum shaft by a drive linkage similar to that used to operate the dispensing mechanism. In such an arrangement, the disturber drum and spikes would serve to propel the apparatus over the sod surface.

Although but a single embodiment of the present invention has been described, other embodiments such as those suggested above will occur to those skilled in the art. It is possible, of course, to use various features of the embodiment described separately or in various combinations. Furthermore, many structural changes are possible and are intended to be within the scope of the present invention.

I claim:

1. A sod disturbing and replanting apparatus of substantial overall weight comprising a frame adapted for translational movement over sodded ground resistant to penetration; means for drawing said frame across the surface of the ground; a cylindrical drum of relatively small diameter rotatably mounted on said frame, said drum having a continuous transversely extending supporting surface around the outer circumference thereof; and a plurality of elongated sod penetrating and disturbing spikes rigidly mounted on said outer drum surface in no more than six transversely extending rows parallel to the drum axis, said rows spaced circumferentially at equal arc intervals and the spikes in each of said rows spaced transversely at equal linear distances and arranged to project radially outward at an angle of inclination toward the direction of operable drum rotation of between 35° and 60° as measured from a line tangent to the drum surface at the spike base, said arc interval and said angle of inclination allowing only one of said rows to engage the ground at the point of maximum spike penetration and said linear distance between spikes allowing apparatus weight to exceed sod penetration resistance by an amount causing the spike row in engagement with the ground to penetrate fully into the sod and the drum surface at the base of the spikes in said row to bear relatively lightly upon the sod surface, adjacent rows of said spikes being transversely offset one-half of said distance between spikes to cause sod penetrations along a line in the direction of translational frame movement at a linear distance apart equal to twice said arc interval, each of said spikes having an outer end tapered to a sharp edge, a uniform cross-sectional shape of significant area between the drum surface and said outer end, and an overall length equal to or greater than ⅓ of the diameter of said cylindrical drum.

2. A sod disturbing and replanting apparatus as claimed in claim 1 wherein the overall weight of said apparatus and said linear distance between spikes in each row provides a penetrating force at full spike penetration equal to or greater than 70 pounds per spike.

3. A sod disturbing and replanting apparatus as claimed in claim 2 wherein said sharp edge at the outer end of said spikes is generated by a taper along two planes intersecting at an acute angle of approximately 30° and said sharp edge is parallel to the drum axis.

4. A sod disturbing and replanting apparatus as claimed in claim 3 wherein each of said sod penetrating and disturbing spikes is mounted on said outer drum surface at an angle of inclination of approximately 45°.

5. A sod disturbing and replanting apparatus as claimed in claim 2 having means for increasing the penetrating force applied to each of said spikes to compensate for changes in sod penetration resistance.

6. A sod disturbing and replanting apparatus as claimed in claim 2 wherein said drum is hollow and adapted to receive and contain a fluid of substantially greater density than air at standard conditions for incerasing the penetrating force applied to each of said spikes to compensate for changes in sod penetration resistance.

References Cited

UNITED STATES PATENTS

| | | | |
|---|---|---|---|
| 517,352 | 3/1894 | Maxwell | 172—554 X |
| 809,716 | 1/1906 | Miller | 172—122 X |
| 895,731 | 8/1908 | Dearing | 172—554 X |
| 1,257,818 | 2/1918 | Dixon | 172—554 |
| 1,289,176 | 12/1918 | Holt | 172—554 X |
| 2,778,291 | 1/1957 | Kerns | 172—554 |
| 2,839,980 | 6/1958 | Evans et al. | 172—611 X |

FOREIGN PATENTS

| | | |
|---|---|---|
| 1,143,354 | 2/1963 | Germany. |

ROBERT E. BAGWILL, Primary Examiner

A.E. KOPECKI, Assistant Examiner

U.S. Cl. X.R.

111—10; 172—611